May 15, 1928.
T. H. STRACHAN
WEIGHING SCALE
Original Filed Aug. 1, 1925   2 Sheets-Sheet 2
1,669,428
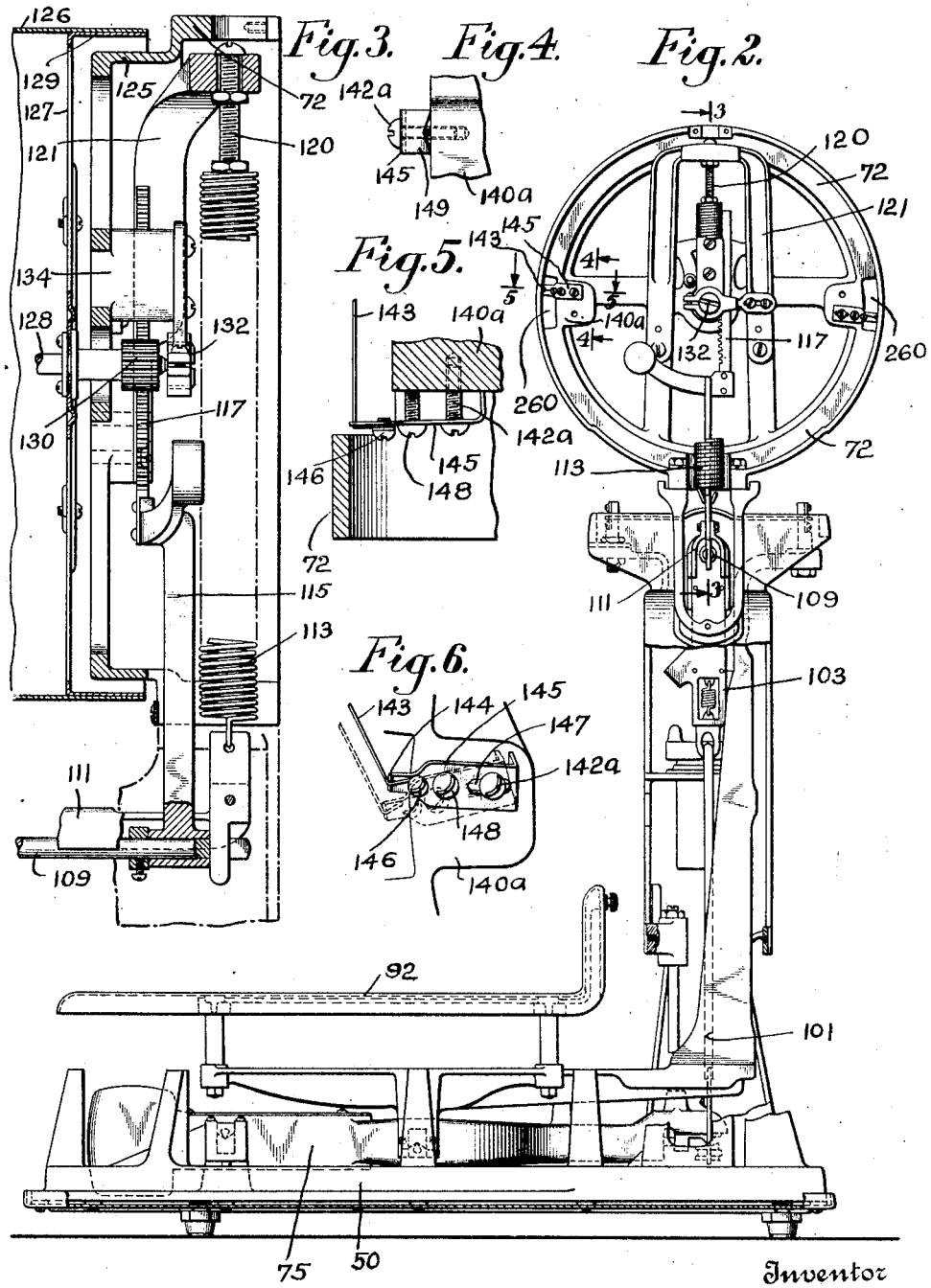
Inventor
T. H. Strachan
By his Attorneys
Cooper, Kerr & Dunham Patented May 15, 1928.

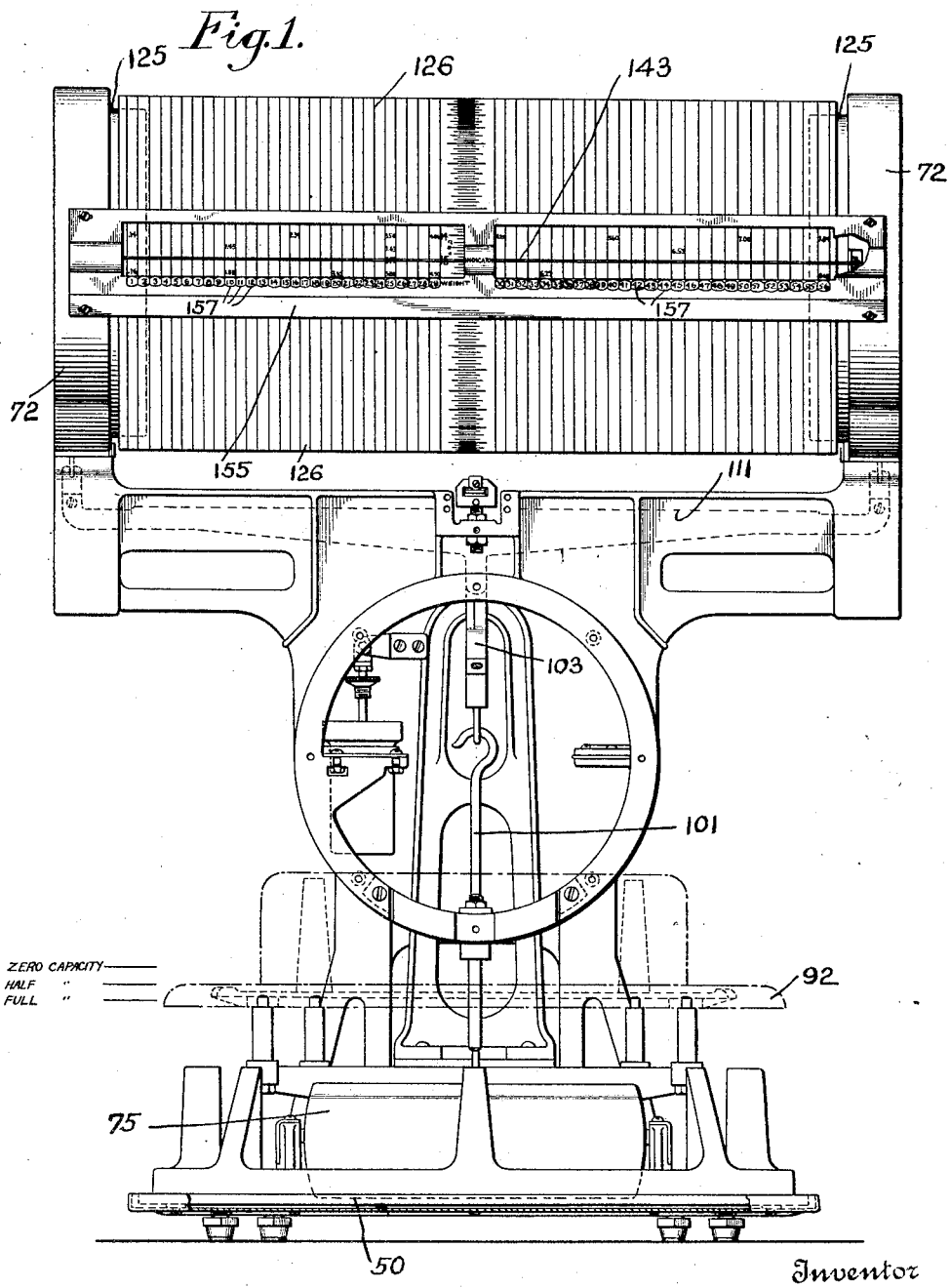

1,669,428

UNITED STATES PATENT OFFICE.

THOMAS HENRY STRACHAN, OF DAYTON, OHIO, ASSIGNOR TO DAYTON SCALE COMPANY, OF DAYTON, OHIO, A CORPORATION OF NEW JERSEY.

WEIGHING SCALE.

Original application filed August 1, 1925, Serial No. 47,472. Divided and this application filed April 14, 1926. Serial No. 101,912.

This invention pertains to weighing scales, being a division of my copending application Serial No. 47,472, filed August 1, 1925, and comprises improvements in details of drums used in certain types of computing scales.

A drum computing scale is provided with a rotatable chart bearing a plurality of columns of values computed according to prices appearing on a fixed plate or bar extending across the drum adjacent the chart. Each column of values on the chart corresponds to one of the prices on the price bar, or "price range", as it is usually called.

It is desirable to have as large an assortment of prices and corresponding columns of values as possible, but their number is limited by the width of the chart.

It is not practical to increase the number by reducing the size of the printed characters on the drum because they must be kept large enough to be easily readable. It has been suggested that the drum may be made as wide as desired and the enclosing casing be made as large as may be necessary in order to enclose the enlarged drum. Such a solution is impractical for various reasons. In the first place, the drum and casing are already as long as is practical to accommodate on counters where the scales are used, or to manufacture economically. In the second place, the weight of the chart structure must be kept as light as possible, for if increased beyond a certain point the accuracy of the scale becomes so impaired as to render it useless as a commercial weighing instrument.

The principal object of this invention is to provide a wider chart without increasing the outside dimensions of the drum and without appreciably increasing the weight of the chart.

Another object is to provide improved adjusting devices for the indicator wire that is provided in drum scales to aid the operator in properly reading weights and values.

In the drawings,

Fig. 1 is a front view of a drum scale with outer casing removed, showing chart, end castings, price range, reading wire, etc.

Fig. 2 is an end view of Fig. 1.

Fig. 3 is an enlarged sectional view of details of the drum operating mechanism.

Figs. 4, 5 and 6 are enlarged detail views of the wire adjusting devices.

The scale comprises, in general, a base 50, on which is fulcrumed a base lever 75 which supports in the well known manner a platform 92.

The free end of lever 75 is connected by steel-yard rod 101 and zero adjusting device 103 to equalizer bar 109 and draw bar 111, which in turn are connected to racks 117 and springs 113 respectively, there being exactly duplicate mechanisms at both ends of the machine.

Mounted rigidly at each end of the drum portion of the scale is an end casting 72, which provides, through boss 134, support for a bearing 132 in which rotates the end of chart shaft 128.

The chart itself, in its best form, consists of a paper cylinder 126 fitted around aluminum spiders 127, which are fast to shaft 128. Near each end of shaft 128 is a pinion 130, enmeshed with rack 117 so as to be rotated thereby when rack 117 moves vertically in response to movements of platform 92. The upper end of spring 113 is secured by screw 120 to a temperature-compensating member 121. As load is applied to the scale platform springs 113 are extended, thereby lowering bars 109 and 111. Racks 117 are also lowered and rotate the chart 126 to a position corresponding to the load on the platform.

It has been customary in the past to make the castings 72 of uniform diameter throughout their axial length, that diameter being such as to accommodate the drum casing which encloses the chart.

For the purpose of my invention I reduce the diameter of the inner portion of the casting, as indicated at 125, to a dimension less than the diameter of the chart, and widen the chart to overlap the reduced portion 125 of the casting as shown in Fig. 3. The end spider 127 has a deep flange 129, and chart 126 extends to the outer edge of flange 129, thus increasing the width of the chart at each end by an amount substantially equal to the depth of flange 129, thus providing room for several additional columns of figures on the chart without increasing the over-all width of the machine. Since shaft 128 is not increased in length, there is very slight increase in weight of the chart assembly, the additional material being only the paper and thin sheet aluminum added to the length of the chart.

I am aware that previous constructions have shown charts overlapping the end castings, but only when the drum shaft was driven at or near its center instead of at its ends as in the present design. In such previous constructions the problem was comparatively simple, as there was no necessity of providing accommodations for springs, racks, pinions, etc., within the ends of the drum, as in the present design, in which, as will be noted, rack bars 115 are offset from racks 117 in order to get around the ends of the chart.

As shown in Fig. 1, chart 126 is marked with columns of graduated weights and values. In the drawing the value columns are indicated by vertical lines with only a few scattered figures to show where they belong.

Across the front of the machine, adjacent the chart, is a price plate 155 bearing prices 157, there being one price for each chart column. Slightly above the row of prices is the fixed reading wire 143. Wire 143 must be accurately positioned with reference to the chart and price range, therefore it requires adjustment in and out, up and down, and also for tension. All these adjustments are provided in the improved device which will now be described.

Each end casting 72 has a flat boss 140ª (Figs. 4, 5 and 6). Threaded into boss 140ª is a screw 142ª. Wire 143 passes over a notch 144 in the L-shaped member 145 and is secured thereto by a screw 146. Member 145 is longitudinally slotted at 147 to receive the stem of screw 142ª. Another screw 148 is threaded into 145. As shown in Figs. 4 and 5 the bent portion 149 of member 145 is provided with sharp corners which bear upon the surface of boss 140. By loosening screws 148 and 142ª the bracket 145 may be moved, thereby permitting the adjustment of wire 143 in or out or up or down, as desired. After the adjustment is secured the adjustment may be locked by tightening screws 142ª. Tension in wire 143 may be regulated by turning screw 148 in or out.

As shown in Fig. 2, wire 143 passes through notches 260 in end castings 72. Thus the reading wire is radially within the periphery of castings 72. This construction enables the drum casing parts to be assembled while the reading wire is in position without liability of the wire being moved from its adjusted position. Also, adjustment or replacement of a reading wire may be effected from the outside of the end castings as the bosses 140ª are on the outer surfaces of the castings, and notches 260 permit the wire to be passed through the end castings 72.

I claim—

1. A weighing scale including an indicating drum having a supporting shaft, means adjacent the end of said shaft for rotating said shaft and drum, said means including pinions on said shaft and racks cooperating with said pinions, and shaft supporting members adjacent the ends thereof, said drum overlapping said supporting members whereby the length of said shaft may be minimized.

2. In a weighing scale of the drum type having end castings to support an indicating drum, a reading wire extending across the drum from one end casting to the other, fastening devices to which the ends of said wire are attached, and means for supporting said reading wire fastening devices upon the outer end faces of the end castings to provide accessibility thereto for adjustment and inspection at points entirely outside the ends of the end castings, said fastening devices being movable relatively to said end castings to provide adjustments of said wire vertically, horizontally and for tension.

3. In a computing scale having a relatively movable chart and a reading wire index therefor, means for supporting said reading wire, said means having provisions for permitting up and down and in and out adjustment of the location of the reading wire and supplemental means for adjusting the tautness of the reading wire to the desired extent after the other adjustments have been secured.

4. A reading wire supporting means and fastening device, said means comprising a clip having a slot therein, a screw threaded into a fixed part and passing freely through said slot, and second screw threaded into said clip and abutting against a fixed part.

5. The invention set forth in claim 4 in which the clip is provided with a projecting portion adapted to also bear upon the fixed part.

6. A weighing scale comprising an indicating drum, a drum shaft, means for driving said shaft at its ends, and a pair of frame members rotatably supporting said shaft, the ends of said drum overlapping said frame members whereby a greater drum length may be secured with a minimum length of drum shaft and with a minimum distance between the points of support therefor.

7. A weighing scale comprising an indicating drum chart, a shaft for supporting the same, means for driving said shaft at both its ends, said means including pinions on said shaft and racks cooperating with said pinions, and frame members for rotatably supporting said shaft, said frame members extending within said drum to provide for maximum length of the drum and for a shorter distance between the points of support of said drum shaft.

8. A weighing scale having in combination, a drum shaft, means for driving said shaft at its ends, a pair of end castings provided with bosses supporting said shaft, and a drum carried by said shaft, said drum overlapping portions of said end castings thereby affording maximum drum length with minimum length of the drum shaft.

9. A weighing scale having an indicating drum and a shaft therefor, pinions upon said shaft substantially upon the ends thereof, a pair of end castings, bearings for said shaft carried by said end castings and disposed outside of the aforesaid pinions, said drum at its ends overlapping said end castings, racks meshing with said pinions and operating members for said racks having offset portions to pass outside the ends of the indicating drum.

10. An indicating device for a weighing scale, comprising in combination, a drum, a shaft on which said drum is mounted, and means comprising a rack and a pinion at each end of said shaft for causing its rotation, the end of said drum extending axially beyond said means.

In testimony whereof I hereto affix my signature.

THOMAS HENRY STRACHAN.